United States Patent Office 3,606,415
Patented Sept. 20, 1971

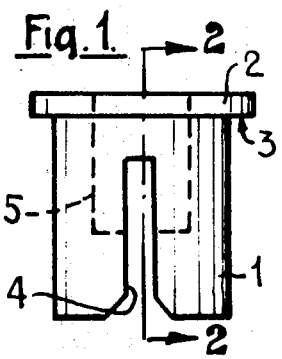
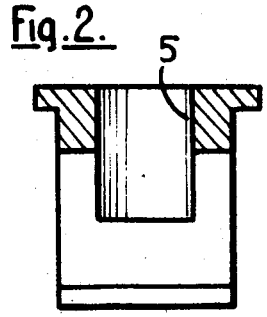
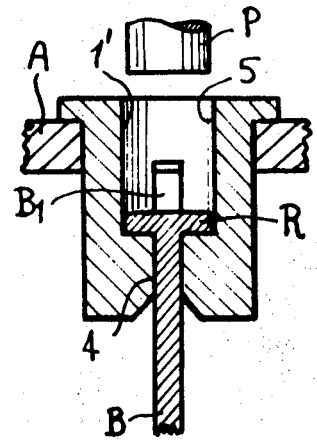
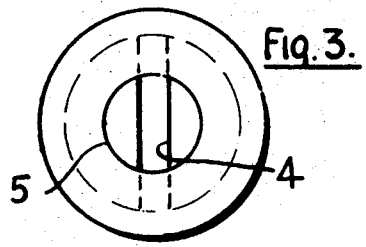
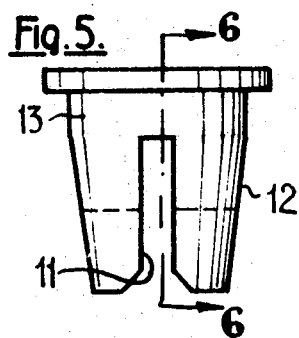
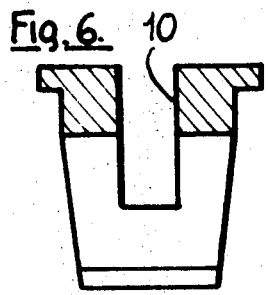
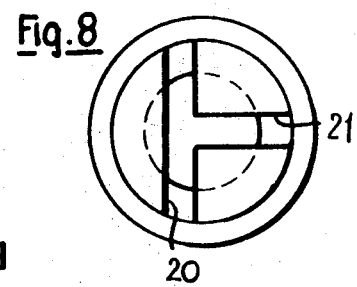
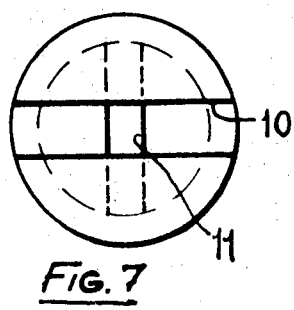
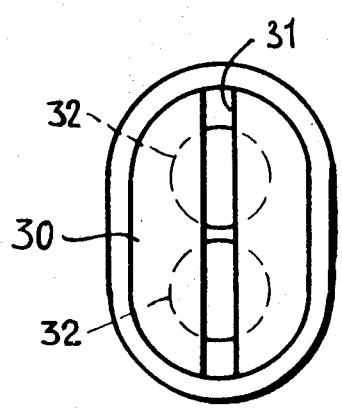

3,606,415
CONNECTING DEVICE FOR FASTENING TOGETHER TWO THIN PLATES IN RELATIVE ANGULAR POSITION
Gerard Friedling, Vernier, and Marcel Chuard, Meyrin, Switzerland, assignors to Technicair S.A., Vernier-Geneve, Switzerland
Filed Apr. 7, 1969, Ser. No. 813,958
Claims priority, application Switzerland, Apr. 5, 1968, 5,134/68
Int. Cl. F16b 17/00
U.S. Cl. 287—189.35
7 Claims

ABSTRACT OF THE DISCLOSURE

A mechanical device for connection of two thin plates in relative angular position, preferably of aluminum sheets, comprising a member adapted to be inserted into an opening of one of the plates, and including an enlarged head portion at one end forming an abutment shoulder, adapted to limit the insertion of the member into the opening and to abut the one of the plates adjacent the opening. The member has a slot starting from the insertable end of the member and extending substantially longitudinally in the member and passing crosswise through the member and adapted to receive the other of the plates and oriented in an angular position relative to that of the one of the plates. The head portion has a recess accessible from the one end thereof and extends longitudinally therefrom overlapping the slot and at least partially extending therein and terminating in a recess end spaced from the insertable end. The recess is adapted to receive a tool and is adapted to receive a flange formation formed on the other of the plates and to project beyond the slot, in order to attach the other of the plates to the member.

---

The present application is a co-pending application with our patent application, Ser. No. 757,259, filed Sept. 4, 1968 and which issued on May 12, 1970 into U.S. Pat. No. 3,511,525.

The present invention relates to a mechanical device for connection of two thin plates in relative angular or perpendicular position, in general, and to such two thin plates of an aluminum sheet, in particular.

It is one object of the present invention to provide a mechanical device for connection of two thin plates in relative angular position, preferably of aluminum sheets, comprising a member adapted to be inserted into an opening of one of the plates, and including an enlarged head portion at one end forming an abutment shoulder, adapted to limit the insertion of the member into the opening and to abut the one of the plates adjacent the opening. The member has a slot starting from the insertable end of the member and extending substantially longitudinally in the member and passing cross-wise through the member and adapted to receive the other of the plates and oriented in an angular position relative to that of the one of the plates. The head portion has a recess accessible from the one end thereof and extends longitudinally therefrom overlapping the slot and at least partially extending therein and terminating in a recess end spaced from the insertable end. The recess is adapted to receive a tool and is adapted to receive a flange formation formed on the other of the plates and to project beyond the slot, in order to attach the other of the plates to the member.

With this and other objects in view, which will become apparent in the following detailed description, the present invention, which is shown by example only, will be clearly understood in connection with the accompanying drawing, in which:

FIG. 1 is an elevation of a first embodiment of the mechanical device designed in accordance with the present invention;

FIG. 2 is a section along the lines 2—2 of FIG. 1;

FIG. 3 is a top plan view of the device disclosed in FIG. 1;

FIG. 4 is an axial section of the mechanical device disclosed in FIG. 1 which connects the two plates;

FIG. 5 is an elevation of a second embodiment of the device designed in accordance with the present invention;

FIG. 6 is a section along the lines 6—6 of FIG. 5;

FIG. 7 is a top plan view of the device disclosed in FIG. 5; and

FIGS. 8 and 9 are bottom plan views of a third and a fourth embodiment of the device designed in accordance with the present invention.

Referring now to the drawing, and in particular to FIGS. 1–4, the mechanical device designed in accordance with the present invention comprises a first cylindrical shank 1 and a head 2 of greater diameter to form a shoulder 3. The shank 1 is crossed by a transverse slot 4 extending from an insertable end of the member. The head 2 defines a rear recess 5 accessible from the rear side of the device and passing into the slot 4 into which it penetrates. The recess 5 is of cylindrical cross-section.

As shown in FIG. 4 of the drawing, in order to assemble the plates A and B in a position perpendicular relative to each other, the shank is inserted into an opening 1' of the plate A, so that the slot 4 receives a marginal portion of the plate B disposed perpendicularly relative to the plate A. The rear recess 5 extends into the slot 4 such, that one part $B_1$ of the plate B extends into the recess 5 and can be formed by means of a mandrel P in order to form at the edge of the plate B a projection R attaching the plate B to the connecting device.

Referring now again to the drawing, and in particular to FIGS. 5 and 7, an embodiment is disclosed, which shows that the rear recess is formed by a transverse slot 10 disposed perpendicularly to a first slot 11. In addition, the shank of the device comprises a slightly conical portion 12 followed by an outside cylindrical portion 13, adapted to be forced into the opening of one of the plates. The portion 13 extends axially on the sole rear part of the device, which is divided by the rear slot 10. Due to this slot 10 the head provides a certain transverse elasticity, which permits the device to be forced elastically into the opening of one of the plates.

Referring now again to the drawing, and in particular to FIG. 8, the outer slot comprises a transverse branch 20 and a blind branch 21. The device can be used by placing a traversing plate into the branch 20 and by placing a non-traversing plate into the blind branch 21, this plate being then positioned longitudinally through the device.

The device can likewise be used for connecting to a first plate two other plates perpendicularly to the first one and forming a right angle between the same. In variations, the device can comprise a plurality of traversing slots or forming, as the case may demand, an angle different from 90°.

Referring now to FIG. 9 of the drawing, the device comprises a shank 30 of straight oblong section traversed in longitudinal direction by a first recess or slot 31. The device comprises two rear recesses 32 projecting into the slot 31. The plate inserted into the recess 31 is thus guided along an appreciable length and retained by two projections formed in the recesses 32. In accordance with a variation, the slot can be curved, in order to adapt to a plate of corresponding shape and in order to give a curved form to a deformable plate during its insertion into the slot.

In accordance with a variation, the recess 32 can present the pitch of a screw permitting to fix hooking devices to the head of the connection device.

One of the applications preferred for the device in accordance with the present invention is the connection of plates of aluminum sheets, in order to form directing walls or for separation of the inside of ventilation tubes, or in order to fix blades to the sheet of a disc in order to form ventilation wheels. The utilization of the device in accordance with the present invention is, however, by no means limited to the connection of metallic plates.

The member is adapted to be forced into the opening of one of the plates and extends axially to the sole part of the member divided by the transverse slot, the plates to be connected being adapted to functionally cooperate therewith. Also the member may be formed as a screw adjacent the head portion.

The device can be made of any suitable material.

While we have disclosed several embodiments of the present invention, it is to be understood that these embodiments are given by example only and not in a limiting sense.

We claim:

1. A mechanical device for connection of two thin plates in relative angular position, preferably of aluminum sheets, comprising:
    a member adapted to be inserted into an opening of one of said plates, and including an enlarged head portion at one end forming an abutment shoulder, adapted to limit the insertion of said member into said opening and to abut said one of said plates adjacent said opening,
    said member having a slot starting from the insertable end of said member and extending substantially longitudinally in said member and passing cross-wise through said member and adapted to receive the other of said plates and oriented in an angular position relative to that of said one of said plates,
    said head portion having a recess accessible from said one end thereof and extending longitudinally therefrom overlapping said slot and at least partially extending therein and terminating in a recess end spaced from said insertable end, and
    said recess being adapted to receive a tool and being adapted to receive a flange formation formed on said other of said plates and to project beyond said slot, in order to attach said other of said plates to said member.

2. The device, as set forth in claim 1, wherein:
    said member comprises a body having a longitudinal axis of symmetry, and
    said recess has a longitudinal axis of symmetry and is coaxial with respect to said member.

3. The device, as set forth in claim 2, wherein:
    said recess is of cylindrical shape.

4. The device, as set forth in claim 1, wherein:
    said recess comprises a transverse slot disposed substantially perpendicularly to said first mentioned slot.

5. The device, as set forth in claim 4, wherein:
    said member is adapted to be forced into said opening of said one of said plates and extends axially to a part of said member divided solely by said transverse slot.

6. The device, as set forth in claim 1, wherein:
    said slot has a blind branch.

7. The device, as set forth in claim 1, wherein:
    said member is formed as a screw adjacent said head portion.

References Cited
UNITED STATES PATENTS

| | | | |
|---|---|---|---|
| 1,014,630 | 1/1912 | Morrill | 287—189.36DUX |
| 2,159,445 | 5/1939 | Murphy | 287—189.36FX |
| 2,673,390 | 3/1954 | Broberg | 287—189.36DX |
| 2,720,289 | 10/1955 | Henrickson | 287—189.35X |
| 2,817,131 | 12/1957 | Seegers | 287—189.35X |
| 3,390,856 | 7/1968 | Van Buren | 287—189.35X |
| 3,464,310 | 9/1969 | Lambert | 85—39 |

REINALDO P. MACHADO, Primary Examiner

W. L. SHEDD, Assistant Examiner

U.S. Cl. X.R.

85—37